US008625793B2

(12) United States Patent
Hawkes et al.

(10) Patent No.: US 8,625,793 B2
(45) Date of Patent: Jan. 7, 2014

(54) RESYNCHRONIZATION FOR PUSH MESSAGE SECURITY USING SECRET KEYS

(75) Inventors: Philip Michael Hawkes, Warrimoo (AU); Andreas K. Wachter, San Francisco, CA (US); Michael Paddon, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 1372 days.

(21) Appl. No.: 12/135,987

(22) Filed: Jun. 9, 2008

(65) Prior Publication Data

US 2009/0319792 A1 Dec. 24, 2009

Related U.S. Application Data

(60) Provisional application No. 60/943,277, filed on Jun. 11, 2007.

(51) Int. Cl.
*H04K 1/00* (2006.01)
*H04L 9/32* (2006.01)

(52) U.S. Cl.
USPC .......................... 380/247; 380/249; 713/170

(58) Field of Classification Search
USPC .................................. 380/247, 249; 713/170
See application file for complete search history.

(56) References Cited

U.S. PATENT DOCUMENTS

| 5,060,266 A * | 10/1991 | Dent | 380/274 |
| 5,241,598 A * | 8/1993 | Raith | 380/248 |
| 5,995,624 A * | 11/1999 | Fielder et al. | 713/169 |
| RE36,752 E * | 6/2000 | Koopman et al. | 380/262 |
| 6,502,135 B1 * | 12/2002 | Munger et al. | 709/225 |
| 7,436,964 B2 * | 10/2008 | Klingler et al. | 380/274 |
| 2007/0016778 A1 * | 1/2007 | Lyle | 713/169 |
| 2007/0105548 A1 * | 5/2007 | Mohan et al. | 455/426.1 |
| 2007/0214496 A1 * | 9/2007 | Perkins et al. | 726/3 |
| 2008/0008138 A1 * | 1/2008 | Pun | 370/338 |
| 2008/0046728 A1 * | 2/2008 | Lyle | 713/169 |

FOREIGN PATENT DOCUMENTS

| TW | 436747 B | 5/2001 |
| TW | 200631375 | 9/2006 |
| TW | 200636488 | 10/2006 |
| TW | 200642404 | 12/2006 |
| WO | WO0124436 | 4/2001 |
| WO | WO2005015819 A1 | 2/2005 |

OTHER PUBLICATIONS

IP in Wireless Networks Section 12.5 Pub. Date: Jan. 31, 2003.*

(Continued)

*Primary Examiner* — Kambiz Zand
*Assistant Examiner* — Benjamin Kaplan
(74) *Attorney, Agent, or Firm* — Won Tae Kim

(57) ABSTRACT

A method for a server to initiate resynchronization with an access terminal, when synchronization has been lost, that cannot be exploited by attackers is provided. The server may provide the access terminal with a secret key that is only known to the access terminal and the server. The access terminal may store the secret key in a secure storage device to prevent the secret key from being hacked. If the server determines that synchronization has been lost, the server may send a resynchronization message to the access terminal with the secret key attached. The access terminal retrieves the stored secret key from the secure memory device and compares it to the secret key attached to the resynchronization message. If there is a match, the access terminal may initiate a secure communication link with the server to reestablish synchronization.

60 Claims, 6 Drawing Sheets

(56) References Cited

OTHER PUBLICATIONS

Appeal from the United States District Court for the District of Nevada in case No. 05-CV-820, Judge Brian E. Sandoval. Decided: Mar. 28, 2008.*

International Search Report and Written Opinion—PCT/US2008/066612—ISA/EPO—Aug. 19, 2009.
Taiwan Search Report—TW097121841—TIPO—May 23, 2012.

* cited by examiner

RESYNCHRONIZATION FOR PUSH MESSAGE SECURITY USING SECRET KEYS

CLAIM OF PRIORITY UNDER 35 U.S.C. §119

The present Application for Patent claims priority to U.S. Provisional Application No. 60/943,277 entitled "Resynchronization for Push Message Security Using Secret Password" filed Jun. 11, 2007, and assigned to the assignee hereof and hereby expressly incorporated by reference herein.

BACKGROUND

1. Field

At least one feature relates to communication systems, and, more particularly, to a method for resynchronizing an access terminal with a server using a secret key.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.)

In communication systems, a user or access terminal may establish a data connection to communicate with a server for sending and receiving messages, such as Short Message Services (SMS) messages. In order to protect the SMS messages from being attacked, the access terminal and server may protect the SMS messages by various known methods in the art, such an encryption using a key. For example, when the server and access terminal communicate with each other they might share a key so that when the server sends a SMS message to the access terminal it will add a message authentication code tag to the SMS message which is computed using that key. The message authentication code tag on the SMS message allows the access terminal to verify the source of the message. This method of protection works well unless the access terminal loses the key or if the key gets changed in memory causing synchronization to be lost between the access terminal and the server. If the access terminal and server lose synchronization, then the server needs to send a push message to request the client to resynchronize. However, finding a secure way for the server to initiate resynchronization that cannot be exploited by attackers is problematic. Consequently, a secure way for the server to initiate resynchronization with an access terminal that cannot be exploited by attackers is needed.

SUMMARY

One aspect provides a method for a server to initiate resynchronization with an access terminal, when synchronization has been lost, that cannot be exploited by attackers. The server may provide the access terminal with a secret key that is only known to the access terminal and the server. The access terminal may store the secret key in a redundant or secure storage device to prevent the secret key from being hacked. If the server determines that synchronization has been lost with the access terminal, the server may send a resynchronization message to the access terminal. The secret key known only to the access terminal and the server may be attached to the resynchronization message. Upon receiving the resynchronization message, the access terminal retrieves the stored secret key from the secure memory device and compares it to the secret key attached to the resynchronization message. If there is a match, the access terminal may initiate a secure communication link with the server to reestablish synchronization. If there is not a match, the access terminal may ignore the resynchronization message as it is coming from an unknown source.

A method operational on an access terminal is provided, comprising: (a) establishing a first secret key for resynchronizing with a server; (b) storing the first secret key in a secure memory device; (c) receiving a resynchronization message from the server when the server detects a loss of synchronization, the resynchronization message including the first secret key; and (d) comparing the stored first secret key to the first secret key in the synchronization message to authenticate the resynchronization message.

The method may further comprise (e) establishing a first link key for verifying messages sent from the server or from entities authorized by the server; and (f) storing the first link key in application memory device. Wherein if the stored first secret key matches the first secret key in the synchronization message, the access terminal may establish a secure communication link with the server.

An access terminal is provided comprising a computer interface and a processing circuit. The processor may be configured to (a) establish a first secret key for resynchronizing with a server; (b) store the first secret key in a secure memory device; (c) receive a resynchronization message from the server when the server detects a loss of synchronization, the resynchronization message including the first secret key; and (d) compare the stored first secret key to the first secret key in the synchronization message to authenticate the resynchronization message.

The processing circuit of the access terminal may be further configured to (e) establish a first link key for verifying messages sent from the server or from entities authorized by the server; and (f) store the first link key in application memory device. Wherein if the stored first secret key matches the first secret key in the synchronization message, the access terminal may establish a secure communication link with the server.

Consequently, an access terminal is provided comprising: (a) means for establishing a first secret key for resynchronizing with a server; (b) means for storing the first secret key in a secure memory device; (c) means for receiving a resynchronization message from the server when the server detects a loss of synchronization, the resynchronization message including the first secret key; and (d) means for comparing the stored first secret key to the first secret key in the synchronization message to authenticate the resynchronization message. The access terminal may further comprise: (e) means for establishing a first link key for verifying messages sent from the server or from entities authorized by the server; and (f) means for storing the first link key in application memory device. Wherein if the stored first secret key matches the first secret key in the synchronization message, the access terminal may further comprise: (g) means for establishing a secure communication link with the server.

Additionally, a circuit for wireless network communications is provided, the circuit may be adapted to (a) establish a first secret key for resynchronizing with a server; (b) store the first secret key in a secure memory device; (c) receive a resynchronization message from the server when the server detects a loss of synchronization, the resynchronization message including the first secret key; and (d) compare the stored first secret key to the first secret key in the synchronization message to authenticate the resynchronization message.

The circuit may be further adapted to: (e) establish a first link key for verifying messages sent from the server or from entities authorized by the server; and (f) store the first link key in application memory device. Wherein if the stored first secret key matches the first secret key in the synchronization message, further adapted to: (g) establish a secure communication link with the server.

A computer readable medium comprising instructions that may be used by one or more processors is provided, the instructions comprising: (a) establish a first secret key for resynchronizing with a server; (b) store the first secret key in a secure memory device; (c) receive a resynchronization message from the server when the server detects a loss of synchronization, the resynchronization message including the first secret key; and (d) compare the stored first secret key to the first secret key in the synchronization message to authenticate the resynchronization message. The instructions may further comprise; (e) establish a first link key for verifying messages sent from the server or from entities authorized by the server; and (f) store the first link key in application memory device. Wherein if the stored first secret key matches the first secret key in the synchronization message, the instructions may further comprise; (g) establish a secure communication link with the server; (h) discard the stored first secret key after the secure communication link has been established; (i) establish a second secret key for resynchronizing with a server; and (j) store the second secret key in the secure memory device.

A method operational on a server is also provided comprising: (a) generating a first secret key for resynchronizing with an access terminal; (b) sending the first secret key to the access terminal over a secure communication link, the first secret key to be stored in a secure memory device on the access terminal; and (c) sending a resynchronization message to the access terminal if synchronization has been lost, the first secret key included to the resynchronization message for verifying identify of the server. The method may also comprise; (d) generating a first link key for verifying a source of the messages or from entities authorized by the server; and (e) sending the first link key to the access terminal over the secure communication link, the first link key to be stored in an application memory device.

A server is provided comprising a computer interface and a processing circuit. The processing circuit may be configured to (a) generate a first secret key for resynchronizing with an access terminal; (b) send the first secret key to the access terminal over a secure communication link, the first secret key to be stored in a secure memory device on the access terminal; and (c) send a resynchronization message to the access terminal if synchronization has been lost, the first secret key included to the resynchronization message for verifying identify of the server. The processing circuit may be further configured to: generate a first link key for verifying a source of the messages or from entities authorized by the server; and send the first link key to the access terminal over the secure communication link, the first link key to be stored in an application memory device.

Consequently, a server is provided comprising: (a) means for generating a first secret key for resynchronizing with an access terminal; (b) means for sending the first secret key to the access terminal over a secure communication link, the first secret key to be stored in a secure memory device on the access terminal; and (c) means for sending a resynchronization message to the access terminal if synchronization has been lost, the first secret key included to the resynchronization message for verifying identify of the server. The server may further comprise: (d) means for generating a first link key for verifying a source of the messages or from entities authorized by the server; (e) means for sending the first link key to the access terminal over the secure communication link, the first link key to be stored in an application memory device; and (f) means for sending traffic messages to the access terminal signed with the first link.

Additionally, a circuit for wireless network communications is provided, the circuit may be adapted to (a) generate a first secret key for resynchronizing with an access terminal; (b) send the first secret key to the access terminal over a secure communication link, the first secret key to be stored in a secure memory device on the access terminal; and (c) send a resynchronization message to the access terminal if synchronization has been lost, the first secret key included to the resynchronization message for verifying identify of the server. The circuit is further adapted to: (d) generate a first link key for verifying a source of the messages or from entities authorized by the server; and (e) send the first link key to the access terminal over the secure communication link, the first link key to be stored in an application memory device.

A computer readable medium comprising instructions that may be used by one or more processors is provided, the instructions comprising: (a) generate a first secret key for resynchronizing with an access terminal; (b) send the first secret key to the access terminal over a secure communication link, the first secret key to be stored in a secure memory device on the access terminal; and (c) send a resynchronization message to the access terminal if synchronization has been lost, the first secret key included to the resynchronization message for verifying identify of the server. The circuit is further adapted to: (d) generate a first link key for verifying a source of the messages or from entities authorized by the server; and (e) send the first link key to the access terminal over the secure communication link, the first link key to be stored in an application memory device.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
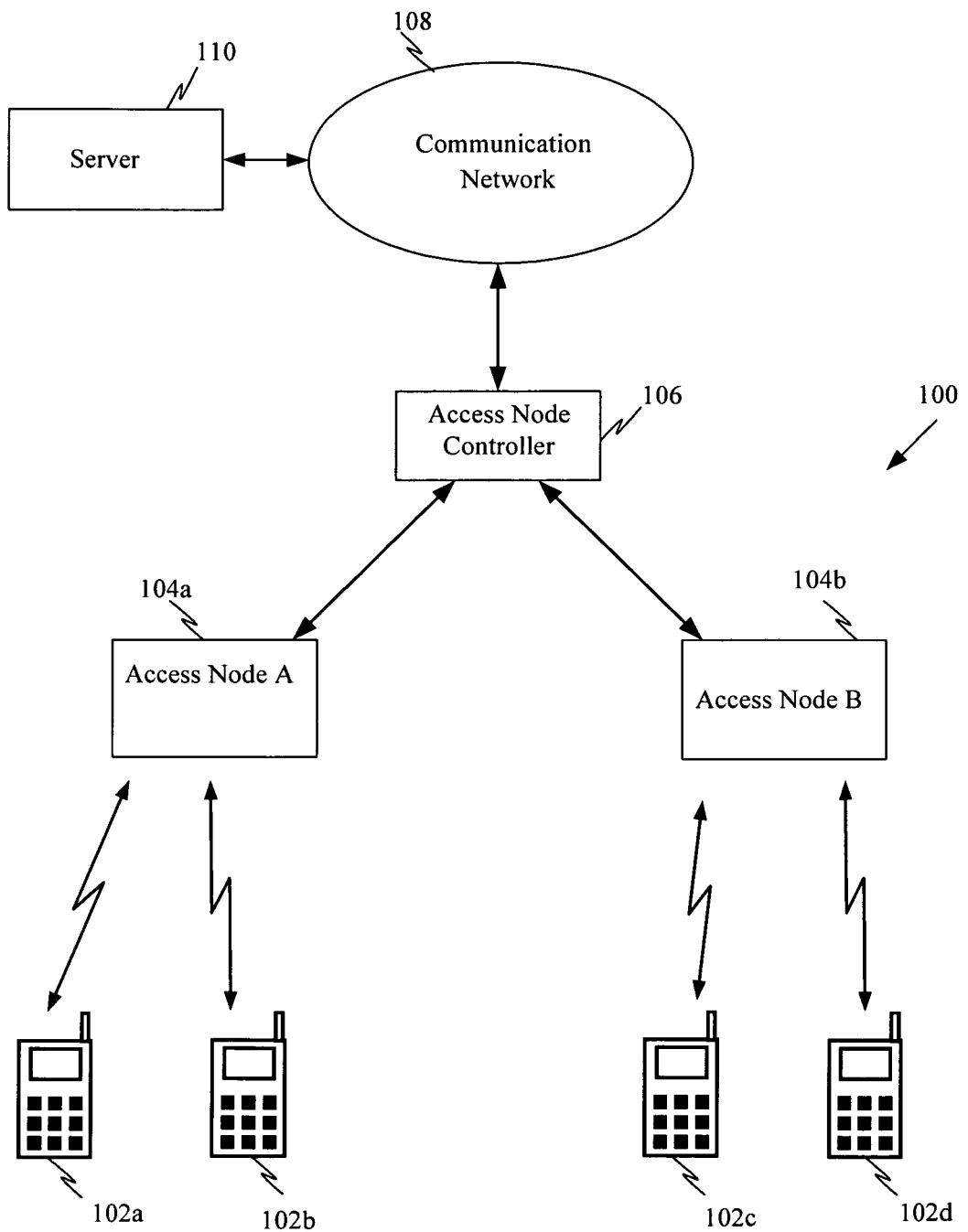
FIG. 1 is a block diagram illustrating a wireless communication system in which secret keys may be used for resynchronizing one or more access terminals with a server.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, certain terminology is used to describe certain features. The terms "access terminal" and "communication device" may be interchangeably used to refer to a mobile device, mobile phone, wireless terminal, and/or other types of mobile or fixed communication apparatus capable of communicating over a wireless network.

One aspect provides a method for a server to initiate resynchronization with an access terminal, when synchronization has been lost, that cannot be exploited by attackers. The server may provide the access terminal with a secret key that is only known to the access terminal and the server. The access terminal may store the secret key in a redundant or secure storage device to prevent the secret key from being hacked. If the server determines that synchronization has been lost with the access terminal, the server may send a resynchronization message to the access terminal. The secret key known only to the access terminal and the server may be attached to the resynchronization message. Upon receiving the resynchronization message, the access terminal retrieves the stored secret key from the secure memory device and compares it to the secret key attached to the resynchronization message. If there is a match, the access terminal may initiate a secure communication link with the server to reestablish synchronization. If there is not a match, the access terminal may ignore the resynchronization message as it is coming from an unknown source.

FIG. 1 is a block diagram illustrating a wireless communication system 100 in which secret keys may be used for resynchronizing one or more access terminals with a server. In the wireless communication system 100, remote stations 102a-102d, also known as access terminals (AT), user equipment or subscriber units, may be mobile or stationary, and may communicate with one or more access nodes 104a and 104b, also known as base stations, base transceiver stations (BTSs) or node Bs. The access terminals 102a-102d may transmit and receive data packets through the one or more access nodes 104a and 104b to an access node controller 106, also known as a base station controller or radio network controller (RNC). Base stations and base station controllers are parts of a network 108 called an access network.

A server 110 may be connected to the network 108. In an access terminal-server application, the server may be able to send or push messages to the access terminals 102a-102d (e.g. using Short Message Service (SMS), Wireless Access Protocol (WAP) push, Uniform Dial Plan (UDP)) when the access terminals 102a-102d may not have a session active. As a result, End-to-End protection such as Integrity protection and/or replay protection and/or encryption of the push message contents may be desired. To maintain this protection, the access terminals 102a-102d may maintain the synchronized state using replay counters and/or keys. If one or more of the access terminals 102a-102d lose synchronization with the server 110, then the server 110 may send a push message to request the one or more access terminals 102a-102d that have lost synchronization to resynchronize.

The access network may transport data packets between multiple access terminals 102a-102d. The access network may be further connected to additional networks outside the access network, such as a corporate intranet or the Internet, and may transport data packets between each access terminal and such outside networks. An access terminal that has established an active traffic channel connection with one or more access nodes may be called an active access terminal, and may be said to be in a traffic state. An access terminal that is in the process of establishing an active traffic channel connection with one or more access nodes may be said to be in a connection setup state. An access terminal may be any data device that communicates through a wireless channel. An access terminal may further be any of a number of types of devices including but not limited to PC card, compact flash, external or internal modem, or wireless phone. The communication link through which the access terminal sends signals to the access node may be called an uplink, also known as a reverse link. The communication link through which an access node sends signals to a remote station may be called a downlink, also known as a forward link.

As used herein, an access node may be a fixed station used for communicating with the access terminals and may also be referred to as, and include some or all the functionality of, a base station, a Node B, or some other terminology. An access terminal may also be referred to as, and include some or all the functionality of, a user equipment (UE), a wireless communication device, terminal, mobile terminal, a mobile station or some other terminology.

The transmission techniques described herein may also be used for various wireless communication systems such as a CDMA system, a TDMA system, an FDMA system, an orthogonal frequency division multiple access (OFDMA) system, a single carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier may be independently modulated with data. An SC-FDMA system may utilize interleaved FDMA (IFDMA) to transmit on subcarriers that are distributed across the system bandwidth, localized FDMA (EFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

Figure 2:
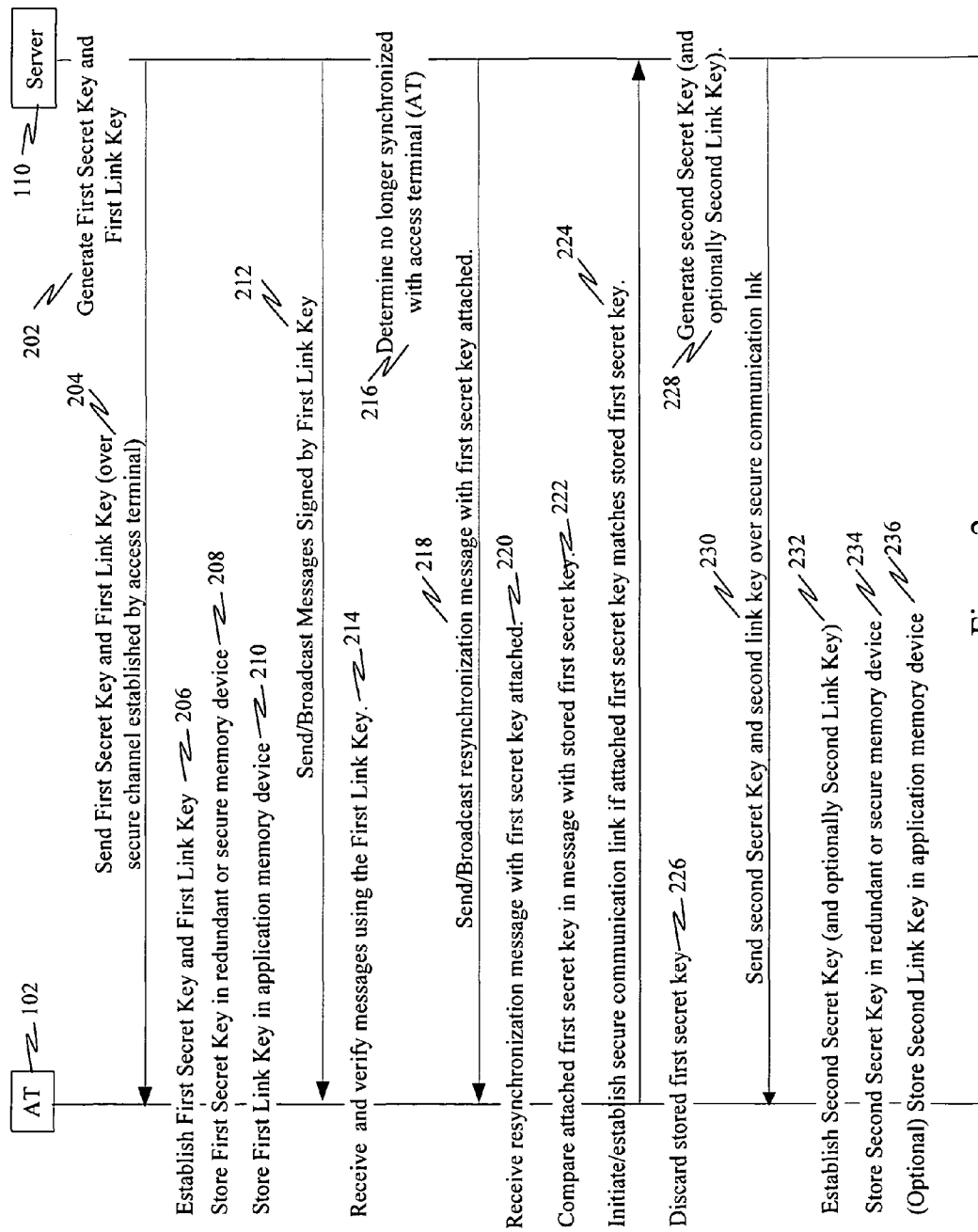
FIG. 2 is a flow diagram illustrating the operation of a wireless communication system in which a server initiates resynchronization with an access terminal.

FIG. 2 is a flow diagram illustrating the operation of a wireless communication system in which a server initiates resynchronization with an access terminal. In this example, the server 110 and access terminal 102 of FIG. 1 are used for illustration purposes. A secure communication link or channel may have been previously established with the access terminal 102. In one example, the server 110 may generate a first secret key and a first link key that are unique to the access terminal 202. The first secret key and the first link key may be generated by any method known in the art that may allow the keys to not be predicted so that they may remain secrets only the server 110 and the access terminal 102 know. For example, the keys may be randomly generated by the server 110, generated with the assistance of a third party (for example in a system using the 3GPP/3GPP2 Generic Bootstrapping Mechanism that may use a Boostrapping Server Function to assist establishing a secret key) or by the access terminal 102 establishing a first root key with the server and computing the first secret key from the first root secret key.

Once the first secret key and the first link key have been generated, the server 110 may send the keys to the access terminal 102 over the secure communication link previously established by the access terminal 204. The keys may be sent using protection, such as encryption, integrity protection and/or replay protection. The server 110 may send the keys via push messaging or during an access terminal-server session. The protection may be specific to the first secret key and the first link key or the protection may be specific to the established end-to-end security or (if applicable) link-layer security. The access terminal may establish the first secret key by receiving it over the secure communication channel 206. Alternatively, as described above, the first secret key may be established by the access terminal, with the assistance of a third party, by computing it from a first root key previously established with the server. Furthermore, the first secret key may be established by any known method in the art. The access terminal may receive the keys from the server the first time that the access terminal contacts the server after it is powered up. The first time that the access terminal contacts the server could be (a) shortly after the access terminal initializes after power-up (if the access terminal is configured in this manner) (b) when the first push message is received (which the access terminal might be unable to process if synchronization has been lost) or (c) when the access terminal contacts the server for an access-initiated session.

After the first secret key and the first link key have been established, the access terminal may store the first secret key in a redundant or secure memory space or device where it may not be corrupted or changed 208. Secure memory device may be more stable than an application memory device as it may not be accessed as much and may not be able to be accessed by hacking the system. As describe above, the first secret key may be unique to the server-access terminal relationship. Next, the first link key may be stored in an application storage space or device as it may be accessed more often than the first secret key 210.

After the first secret key and the first link key have been established, the server may push, send or broadcast messages to the access terminal. Messages sent from the server to the access terminal may be signed using the first link key 212. The access terminal may receive the messages and verify or authenticate the messages using the first link key it has stored in the application memory device 214. The access terminal may verify that the messages are being sent from the server or from other entities authorized by the server. If the server sends or pushes messages to the access terminal and the access terminal does not acknowledge or respond to these messages, the server may determine that synchronization with the access terminal has been lost and the access terminal and server are no longer in an active session 216. Upon making the determination that synchronization has been lost, the server may push, send or broadcast a resynchronization message to the access terminal. The resynchronization message may include the first secret key previously sent to the access terminal from the server which may be stored in the secure memory device on the access terminal 218. The first secret key attached to the resynchronization message may not be protected using encryption, integrity protection or replay protection (since the encryption, integrity protection or replay protection may also be out of synch). The server may continually or repeatedly send or push messages to the access terminal where the messages contain the first secret key until the access terminal contacts the server for resynchronization (for example, if the push message was not delivered successfully).

Next, the access terminal may receive the resynchronization message with the first secret key attached 220. To verify the message, the access terminal may retrieve the first secret key it stored in the secure memory device and compare it to the first secret key that was attached to the resynchronization message 222. If the stored first secret key and the attached first secret key match, the access terminal may authenticate or verify the source of the resynchronization message and may initiate or establish a secure communication link with the server for resynchronization 224. Next, the access terminal may discard the first secret key that is has stored in the secure memory location in anticipation of a new or second secret key

226. The server may then generate a second secret key and optionally may generate a second link key 228. The second secret key, and optionally the second link key, may be generated as described above. The second secret key and the second link key (if generated) may then be pushed, sent or broadcast to the access terminal over the secure communication link established by the access terminal 230. Next, the access terminal may establish the second secret key by receiving it over the secure communication channel 232. Alternatively, as described above, the second secret key may be established by the access terminal with the assistance of a third party or may be established by computing it from a second root key previously established with the server. The second secret key may also be established by any other known method in the art.

After the second secret key, and optionally the second link key, have been established, the access terminal may store the second secret key in the redundant or secure memory device where it may not be corrupted or changed 234. The second secret key may be unique to the server-access terminal relationship. If established, the second link key may be stored in the application storage device as it may be accessed more often 236. The access terminal may ensure that the first secret key may be stored in such a way that corruption of the first secret key may be detected. The access terminal may initiate resynchronization when corruption of the first secret key is detected.

An attacker may not be able to predict the secret keys and only sees the secret keys after the server has sent a secret key to initiate a resynchronization. The attacker may gain nothing by replaying that message since it is only of use up until when the access terminal initiates resynchronization. Since the secret key may be sent without protection during resynchronization, the access terminal may be able to verify the resynchronization message using the secret key as described above.

The secret keys may be different than the link keys so that an attacker may not be able to intercept the secret key being sent, stop that message being delivered, and then the use the value of the secret key in the way that the link key is used (that is, for generating verifiable messages) to send fake messages to the access terminal. If the secret and link key are the same, fake messages may then be verified at the access terminal.

Figure 3:
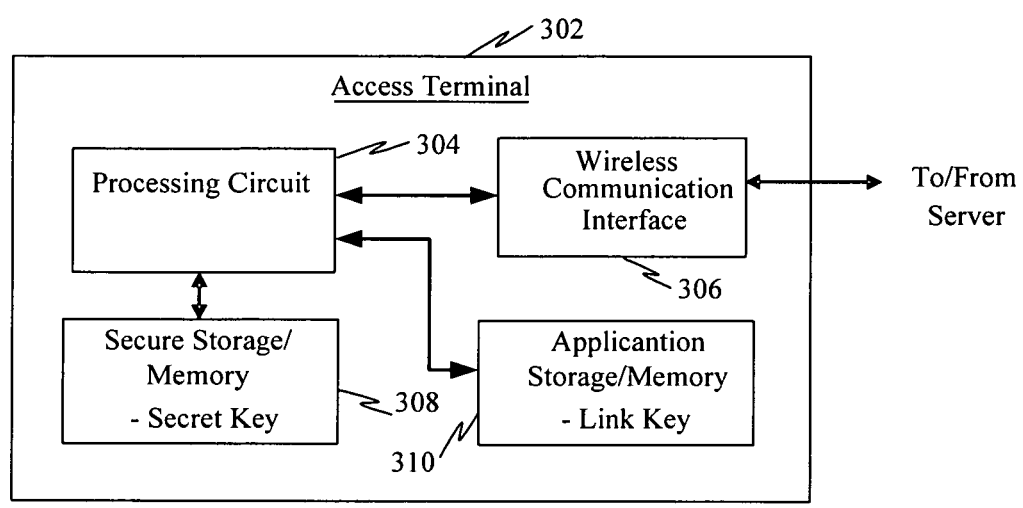
FIG. 3 is a block diagram illustrating an access terminal configured to perform resynchronization using a secret key with a server.

FIG. 3 is a block diagram illustrating an access terminal configured to perform resynchronization with a server using a secret key. The access terminal 302 may include a processing circuit 304 coupled to a wireless communication interface 306 to communicate over a wireless network with a server, a secure storage device 308 to store a secret key that may be uniquely associated with the access terminal and the server and an application storage device 310 to store a link key uniquely associated with the access terminal and the server. The processing circuit 304 may be configured authenticate or verify messages sent by the server and to initiate a secure communication link with the server for resynchronization.

Figure 4:
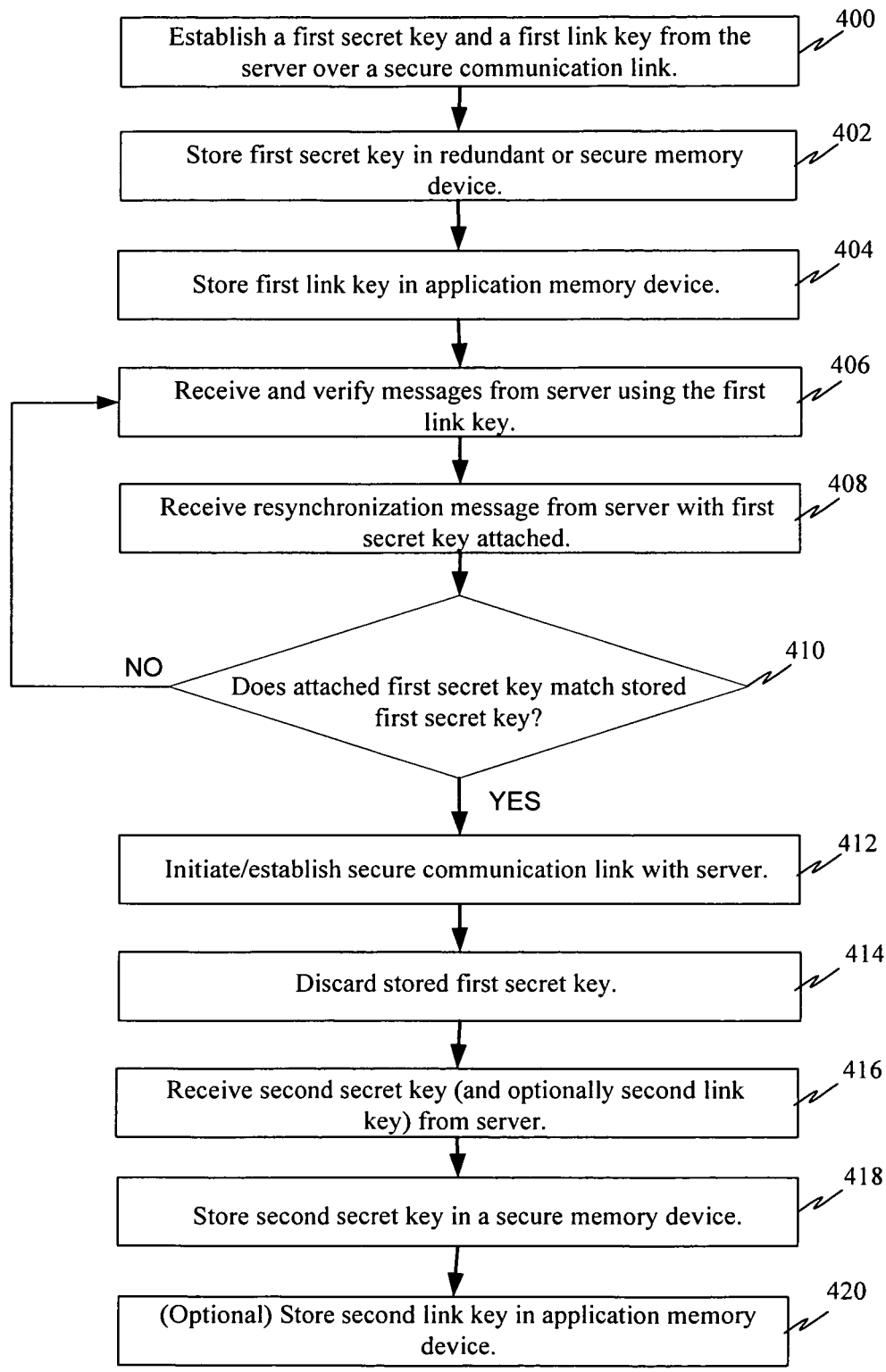
FIG. 4 is a flow diagram illustrating a method operational in an access terminal to perform resynchronization with a server using a secret key.

FIG. 4 is a flow diagram illustrating a method operational in an access terminal to perform resynchronization with a server using a secret key. Initially, a secure communication link may be established with the server. The access terminal may then listen for broadcasts from the server so that it may establish a first secret key and a first link key 400. The first secret key and the first link key may be unique to the particular access terminal and server combination. Upon establishing the first secret key, the access terminal may store the first secret key in a secure memory space or device 402. Upon receiving the first link key, the access terminal may store the first link key in an application memory space or device 404.

The access terminal may then listen for pushed, sent or broadcasted messages from the server. When messages are received, the access terminal may verify or authenticate the sender of the message using the first link key 406. As the first link key may be unique with the server, the access terminal may know if the messages are from the server or from another sender. If the first link key sent with the pushed message matches the first link key the access terminal has stored in the application memory device, the pushed message may be verified as coming from the server. If the access terminal falls out of synchronization with the server, it may receive a resynchronization message from the server with the first secret key attached 408. If a resynchronization message is identified, the access terminal may determine if the attached first secret key matches the first secret key it stored in the secure memory device 410. If the stored first secret key and the attached first secret key do not match, the access terminal may continue to receive and verify messages from pushed, sent or broadcast from the server using the first link key 408, as described above. If the stored first secret key and the attached first secret key match, the access terminal may initiate or establish a secure communication link or channel with the server in preparation for resynchronization 412. After establishing the secure communication link, the access terminal may discard the first secure key stored in the secure memory storage in preparation for establishing new or second secret key 414.

The access terminal may then listen for broadcasts from the server so that it may establish a second secret key, and optionally establish a second link key 416. The second secret key and the second link key, if established, may be unique to the particular access terminal and server combination. Upon receiving the second secret key, the access terminal may store the second secret key in the secure memory device 418. If a second link key is received, the access terminal may store the second link key in the application memory device 420. Alternatively, if a second link key is not established, the access terminal and the server may continue to utilize the first link key to send and verify messages. This resynchronization process may be repeated each time there is a loss of synchronization.

Furthermore, the first link key may be updated/refreshed/changed multiple times prior to a resynchronization message being received. As a result, the first secret key may not be changed despite the first link key being changed.

According to yet another configuration, a circuit in an access terminal may be adapted to perform resynchronization with a server. The same circuit, a different circuit, or a second section of the same or different circuit may be adapted to establish a first secret key and a first link key with the server over a secure communication link. In addition, the same circuit, a different circuit, or a third section may be adapted to store the first secret key in a redundant or secure memory device. Similarly, the same circuit, a different circuit, or a fourth section may be adapted to store the first link key in an application memory device. The same circuit, a different circuit, or a fifth section may be adapted to receive and verify messages from the server using the first link key. The same circuit, a different circuit, or a sixth section may be adapted to receive resynchronization messages from the server with the first secret key attached. The same circuit, a different circuit, or a seventh section may be adapted to compare the stored first secret key with the first secret key attached to the resynchronization message. The same circuit, a different circuit, or an eighth section may be adapted to initiate or establish a secure communication link with the server. The same circuit, a different circuit, or a ninth section may be adapted to discard the stored first secret key. The same circuit, a different circuit, or a tenth section may be adapted to receive a second secret key and optionally a second link key from the server. The same circuit, a different circuit, or an eleventh section may be adapted to store the second secret key in the secure memory device. The same circuit, a different circuit, or a twelfth section may be adapted to store a second link key in the application memory device if the server generates a second link key.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Figure 5:
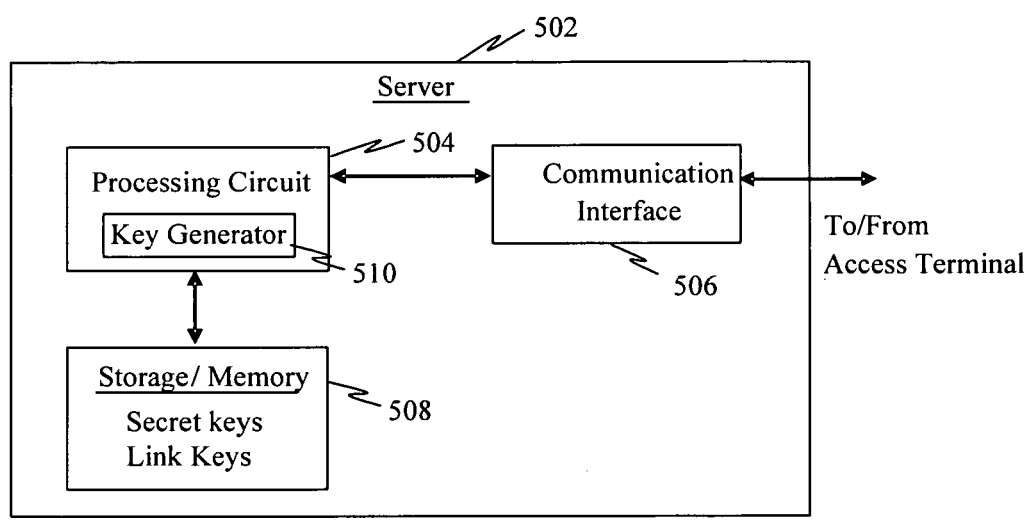
FIG. 5 is a block diagram illustrating a server configured to facilitate resynchronization with an access terminal using a secret key.

FIG. 5 is a block diagram illustrating a server configured to facilitate resynchronization with an access terminal using a secret key. The authenticator 502 may include a processing circuit 504 coupled to a communication interface 506 to communicate over a network with an access terminal and a storage device 508 to store secret keys and link keys uniquely associated with access terminals. The processing circuit 504 (e.g., processor, processing module, etc.) may include a key generator module 510 configured to generate one or more secret and link keys that can be used to secure a communication session. In various applications, the server 502 may be a located at a network controller or it may be co-located with one or more access nodes.

Figure 6:
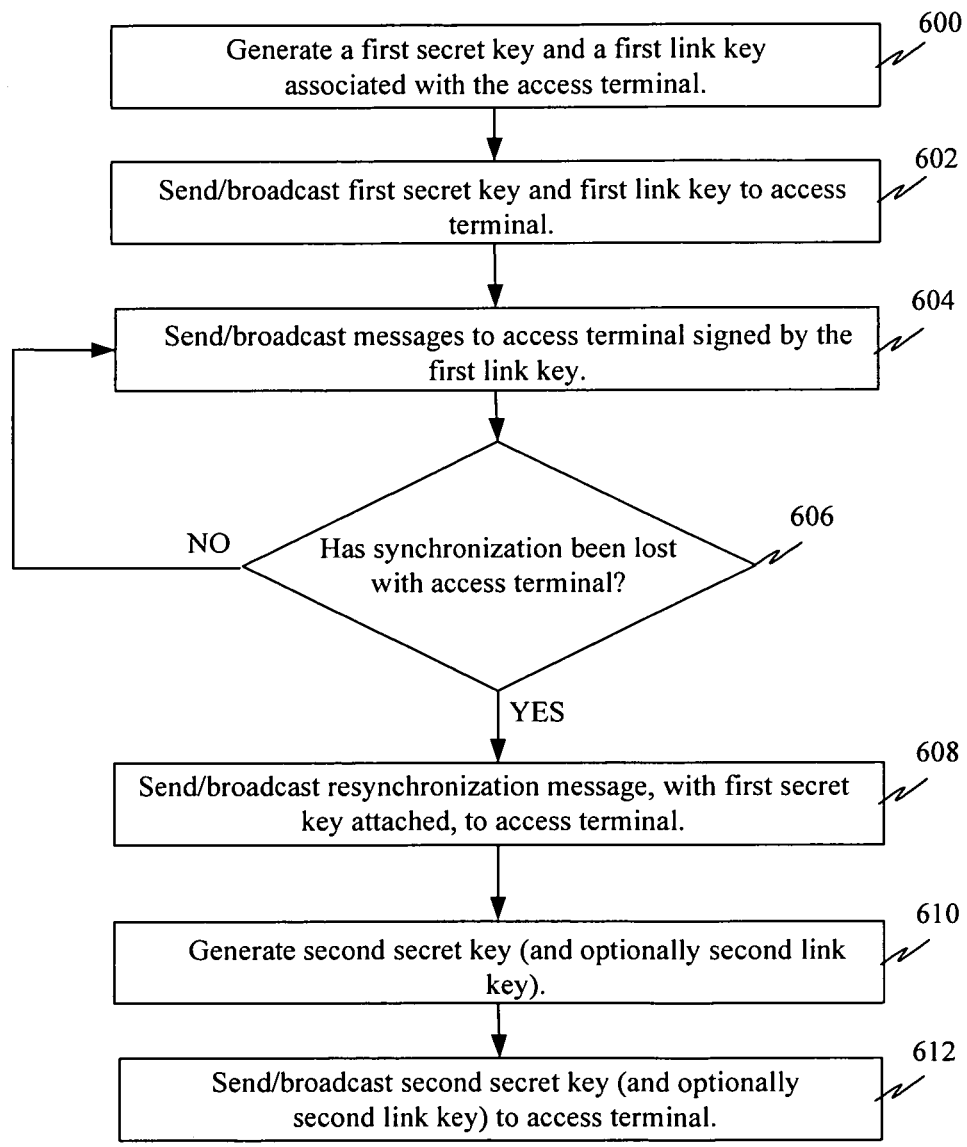
FIG. 6 is a flow diagram illustrating a method operational in a server access terminal to facilitate resynchronization with an access terminal using a secret key.

FIG. 6 is a flow diagram illustrating a method operational in a server to facilitate resynchronization with an access terminal using a secret key. Initially, the server may generate a first secret key and a first link key uniquely associated with an access terminal 600. As described above, the first secret key and the first link key may be generated by any method known in the art that may allow the keys to not be predicted so that they may remain secrets only the server and the access terminal know.

The first secret key and the first link key may be sent to the access terminal over the secure communication link or channel that may have been previously established by the access terminal 602. The sever may then push, send or broadcast messages signed with the first link key to the access terminal 604. The server may determine if synchronization has been lost with the access terminal 606. It may be determined that synchronization has been lost if the server does not receive a reply to messages it is sending or if it gets a denial to a message from the access terminal, for example if the access terminal lost the first link key. If synchronization has not been lost, the server may continue to broadcast messages signed with the first link key to the access terminal 604. If synchronization has been lost, the server may push, send or broadcast a resynchronization message, with the first secret key attached, to the access terminal 608. A second secret key and optionally a second link key may then be generated by the server 610. Once generated, the server may push, send or broadcast the second secret key and the second link key, if generated, to the access terminal 612. Alternatively, if a second link key is not generated, the access terminal and the server may continue to utilize the first link key to send and verify messages. This resynchronization process may be repeated each time there is a loss of synchronization.

Furthermore, the first link key may be updated/refreshed/changed multiple times prior to a resynchronization message being received. As a result, the first secret key may not be changed despite the first link key being changed.

According to yet another configuration, a circuit in a server may be adapted to perform resynchronization using a secret key with the access terminal. The same circuit, a different circuit, or a second section of the same or different circuit may be adapted to generate a first secret key and a first link key associated with the access terminal. In addition, the same circuit, a different circuit, or a third section may be adapted to send or broadcast the first secret key and the first link key to the access terminal. Similarly, the same circuit, a different circuit, or a fourth section may be adapted to send or broadcast messages signed with the first link key to the access terminal. The same circuit, a different circuit, or a fifth section may be adapted to determine if synchronization has been lost with the access terminal. The same circuit, a different circuit, or a sixth section may be adapted to send or broadcast a resynchronization message, with the first secret key attached, to the access terminal. The same circuit, a different circuit, or a seventh section may be adapted to generate a second secret key and optionally a second link key uniquely associated with the access terminal. The same circuit, a different circuit, or an eighth section may be adapted to send or broadcast the second secret key and the second link key, if generated, to the access terminal.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5 and/or 6 may be rearranged and/or combined into a single component, step, or function or embodied in several components, steps, or functions. Additional elements, components, steps, and/or functions may also be added. The apparatus, devices, and/or components illustrated in FIGS. 1, 3, and 5 may be configured or adapted to perform one or more of the methods, features, or steps described in FIGS. 2, 4 and/or 6. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

The invention claimed is:
1. A method operational on an access terminal, comprising:
  establishing a first secret key for resynchronizing with a server;
  storing the first secret key in a secure memory device;

receiving a resynchronization message from the server when the server detects a loss of synchronization, the resynchronization message including an attached first secret key;

comparing the stored first secret key to the attached first secret key in the synchronization message to authenticate the resynchronization message; and in response to a determination that the stored first key matches the attached first secret key in the resynchronization message, receiving a second secret key, storing the second secret key in the secure memory device, and comparing the second secret key to an attached second secret key in a second resynchronization message when another loss of synchronization occurs.

2. The method of claim 1, further comprising:

establishing a first link key for verifying messages sent from the server or from entities authorized by the server; and storing the first link key in application memory device.

3. The method of claim 2, wherein the first secret key and the first link key are randomly selected by the server.

4. The method of claim 2, wherein the server repeatedly sends the resynchronization message to the access terminal until a reply is received from the access terminal.

5. The method of claim 2, wherein the first link key allows the access terminal to identify received messages that should be processed and those that should be ignored.

6. The method of claim 2, wherein the first secret key and the first link key are different.

7. The method of claim 1, wherein if the stored first secret key matches the first secret key in the synchronization message, further comprising:

establishing a secure communication link with the server.

8. The method of claim 7, further comprising:

discarding the stored first secret key after the secure communication link has been established.

9. The method of claim 8, further comprising:

establishing the second secret key for resynchronizing with the server; and storing the second secret key in the secure memory device.

10. The method of claim 9, wherein the second secret key is randomly selected by the server.

11. The method of claim 9, further comprising:

establishing a second link key for verifying messages sent from the server; and storing the second link key in the application memory device.

12. The method of claim 1, wherein the resynchronization message is sent after the access terminal fails to respond to messages sent by the server.

13. The method of claim 12, wherein the messages are Short Message Service (SMS) messages.

14. The method of claim 13, wherein the messages are signed using the first link key and the access terminal uses the first link key stored in the application memory device to verify the messages.

15. The method of claim 1, wherein the resynchronization message is sent unencrypted.

16. The method of claim 1, wherein the access terminal is a mobile wireless device.

17. An access terminal comprising:

a communication interface;

a processing circuit coupled to the communication interface, the processing circuit configured to:

establish a first secret key for resynchronizing with a server;

store the first secret key in a secure memory device;

receive a resynchronization message from the server when the server detects a loss of synchronization, the resynchronization message including an attached first secret key;

compare the stored first secret key to the attached first secret key in the synchronization message to authenticate the resynchronization message; and in response to a determination that the stored first key matches the attached first secret key in the resynchronization message, receive a second secret key, store the second secret key in the secure memory device, and compare the second secret key to an attached second secret key in a second resynchronization message when another loss of synchronization occurs.

18. The access terminal of claim 17, wherein the processing circuit is further configured to:

establish a first link key for verifying messages sent from the server or from entities authorized by the server; and store the first link key in application memory device.

19. The access terminal of claim 18, wherein the first secret key and the first link key are randomly selected by the server.

20. The access terminal of claim 18, wherein the first link key allows the access terminal to identify received messages that should be processed and those that should be ignored.

21. The access terminal of claim 18, wherein the first secret key and the first link key are different.

22. The access terminal of claim 17, wherein if the stored first secret key matches the first secret key in the synchronization message, the processing circuit is further configured to:

establish a secure communication link with the server.

23. The access terminal of claim 22, wherein the processing circuit is further configured to:

discard the stored first secret key after the secure communication link has been established.

24. The access terminal of claim 23, wherein the processing circuit is further configured to:

establish the second secret key for resynchronizing with the server; and store the second secret key in the secure memory device.

25. The access terminal of claim 17, wherein the resynchronization message is sent after the access terminal fails to respond to messages sent by the server.

26. The access terminal of claim 25, wherein the messages are signed using the first link key and the access terminal uses the first link key stored in the application memory device to verify the messages.

27. A circuit for wireless network communications, wherein the circuit is adapted to:

establish a first secret key for resynchronizing with a server;

store the first secret key in a secure memory device;

receive a resynchronization message from the server when the server detects a loss of synchronization, the resynchronization message including an attached first secret key;

compare the stored first secret key to the attached first secret key in the synchronization message to authenticate the resynchronization message; and in response to a determination that the stored first key matches the attached first secret key in the resynchronization message, receive a second secret key, store the second secret key in the secure memory device, and compare the second secret key to an attached second secret key in a second resynchronization message when another loss of synchronization occurs.

28. The circuit of claim 27, further adapted to:
establish a first link key for verifying messages sent from the server or from entities authorized by the server; and
store the first link key in application memory device.

29. The circuit of claim 27, wherein if the stored first secret key matches the first secret key in the synchronization message, further adapted to:
establish a secure communication link with the server.

30. The circuit of claim 29, further adapted to:
discard the stored first secret key after the secure communication link has been established;
establish the second secret key for resynchronizing with the server; and
store the second secret key in the secure memory device.

31. A non-transitory computer-readable medium comprising instructions for resynchronization, which when executed by a processor causes the processor to:
establish a first secret key for resynchronizing with a server;
store the first secret key in a secure memory device;
receive a resynchronization message from the server when the server detects a loss of synchronization, the resynchronization message including an attached first secret key;
compare the stored first secret key to the attached first secret key in the synchronization message to authenticate the resynchronization message; and
in response to a determination that the stored first key matches the attached first secret key in the resynchronization message, receive a second secret key, store the second secret key in the secure memory device, and compare the second secret key to an attached second secret key in a second resynchronization message when another loss of synchronization occurs.

32. The non-transitory computer-readable medium of claim 31, further comprising instructions which when executed by a processor causes the processor to:
establish a first link key for verifying messages sent from the server or from entities authorized by the server; and
store the first link key in application memory device.

33. The non-transitory computer-readable medium of claim 31, wherein if the stored first secret key matches the first secret key in the synchronization message, further comprising instructions which when executed by a processor causes the processor to:
establish a secure communication link with the server;
discard the stored first secret key after the secure communication link has been established;
establish the second secret key for resynchronizing with the server; and
store the second secret key in the secure memory device.

34. A method operational on a server, comprising:
generating a first secret key for resynchronizing with an access terminal;
sending the first secret key to the access terminal over a secure communication link, the first secret key to be stored in a secure memory device on the access terminal;
sending a resynchronization message to the access terminal if synchronization has been lost, the resynchronization message including an attached first secret key for verifying identify of the server; and
in response to a determination that the stored first key matches the attached first secret key in the resynchronization message, sending a second secret key for storing in the secure memory device, the stored second secret key compared to an attached second secret key in a second resynchronization message received when another loss of synchronization occurs.

35. The method of claim 34, further comprising:
generating a first link key for verifying a source of the messages or from entities authorized by the server; and
sending the first link key to the access terminal over the secure communication link, the first link key to be stored in an application memory device.

36. The method of claim 35, wherein the first secret key and the first link key are randomly generated.

37. The method of claim 35, wherein the synchronization with the access terminal has been lost if the access terminal fails to respond to messages sent by the server.

38. The method of claim 35, further comprising
sending traffic messages to the access terminal signed with the first link key.

39. The method of claim 35, wherein the first link key allows the access terminal to identify received messages that should be processed and those that should be ignored.

40. The method of claim 35, wherein the first secret key and the first link key are different.

41. The method of claim 34, wherein the resynchronization message is sent unencrypted.

42. The method of claim 34, wherein the first secret key is initially sent using encryption, integrity protection or replay protection.

43. The method of claim 34, wherein the resynchronization message is sent if the traffic messages are unacknowledged by the access terminal.

44. The method of claim 34, further comprising:
generating the second secret key for resynchronizing with the access terminal; and
sending the second secret key to the access terminal over a secure communication link initiated by the access terminal, the second secret key to be stored in the secure memory device on the access terminal.

45. The method of claim 44, wherein the second secret key is sent using encryption, integrity protection or replay protection.

46. The method of claim 39, wherein the access terminal is a mobile wireless device.

47. A server comprising:
a communication interface;
a processing circuit coupled to the communication interface, the processing circuit configured to:
generate a first secret key for resynchronizing with an access terminal;
send the first secret key to the access terminal over a secure communication link, the first secret key to be stored in a secure memory device on the access terminal;
send a resynchronization message to the access terminal if synchronization has been lost, the resynchronization message including an attached first secret key for verifying identify of the server; and
in response to a determination that the stored first key matches the attached first secret key in the resynchronization message, send a second secret key for storing in the secure memory device, the stored second secret key compared to an attached second secret key in a second resynchronization message received when another loss of synchronization occurs.

48. The server of claim 47, wherein the processing circuit is further configured to:
generate a first link key for verifying a source of the messages or from entities authorized by the server; and send the first link key to the access terminal over the secure communication link, the first link key to be stored in an application memory device.

49. The server of claim 48, wherein the first secret key and the first link key are randomly generated.

50. The server of claim 48, wherein the first secret key and the first link key are different.

51. The server of claim 47, wherein the resynchronization message is sent unencrypted.

52. The server of claim 47, wherein the processing circuit is further configured to:
send traffic messages to the access terminal signed with the first link key.

53. The server of claim 47, wherein the resynchronization message is sent if the traffic messages are unacknowledged by the access terminal.

54. The server of claim 47, wherein the processing circuit is further configured to:
generate the second secret key for resynchronizing with the access terminal; and
send the second secret key to the access terminal over a secure communication link initiated by the access terminal, the second secret key to be stored in the secure memory device on the access terminal.

55. A circuit for wireless network communications, wherein the circuit is adapted to:
generate a first secret key for resynchronizing with an access terminal;
send the first secret key to the access terminal over a secure communication link, the first secret key to be stored in a secure memory device on the access terminal;
send a resynchronization message to the access terminal if synchronization has been lost, the resynchronization message including an attached first secret key for verifying identify of the server; and
in response to a determination that the stored first key matches the attached first secret key in the resynchronization message, send a second secret key for storing in the secure memory device, the stored second secret key compared to an attached second secret key in a second resynchronization message received when another loss of synchronization occurs.

56. The circuit of claim 55, wherein the circuit is further adapted to
generate a first link key for verifying a source of the messages or from entities authorized by the server; and
send the first link key to the access terminal over the secure communication link, the first link key to be stored in an application memory device.

57. The circuit of claim 55, wherein the synchronization with the access terminal has been lost if the access terminal fails to respond to messages sent by the server.

58. A non-transitory computer-readable medium comprising instructions for resynchronization, which when executed by a processor causes the processor to:
generate a first secret key for resynchronizing with an access terminal;
send the first secret key to the access terminal over a secure communication link, the first secret key to be stored in a secure memory device on the access terminal;
send a resynchronization message to the access terminal if synchronization has been lost, the resynchronization message including an attached first secret key for verifying identify of the server; and
in response to a determination that the stored first key matches the attached first secret key in the resynchronization message, send a second secret key for storing in the secure memory device, the stored second secret key compared to an attached second secret key in a second resynchronization message received when another loss of synchronization occurs.

59. The non-transitory computer-readable medium of claim 58, further comprising instructions which when executed by a processor causes the processor to
generate a first link key for verifying a source of the messages or from entities authorized by the server; and
send the first link key to the access terminal over the secure communication link, the first link key to be stored in an application memory device.

60. The non-transitory computer-readable medium of claim 58, wherein the synchronization with the access terminal has been lost if the access terminal fails to respond to messages sent by the server.

* * * * *